United States Patent [19]
Sargent et al.

[11] Patent Number: 5,678,876
[45] Date of Patent: Oct. 21, 1997

[54] MOUNTING BRACKETS FOR REMOVABLE VEHICLE TAILGATE

[76] Inventors: Robert P. Sargent, 11113 E. 38th Ave., Spokane, Wash. 99206; Bruce O. Burton, 3519 E. 17th Ave., Spokane, Wash. 99223

[21] Appl. No.: 615,826

[22] Filed: Mar. 14, 1996

[51] Int. Cl.$^6$ ............................................. B60J 5/12
[52] U.S. Cl. ............................................. 296/52; 296/53
[58] Field of Search ............................. 296/52, 53, 50

[56] References Cited

U.S. PATENT DOCUMENTS

| | | | |
|---|---|---|---|
| 1,066,996 | 7/1913 | Cheney | 296/53 |
| 1,275,338 | 8/1918 | Wells | 296/52 |
| 1,311,644 | 7/1919 | Flom | 296/52 |
| 1,558,292 | 10/1925 | Russell | 296/53 |
| 2,623,778 | 12/1952 | Thompson | 296/52 |
| 5,117,532 | 6/1992 | Holland | 296/50 X |

OTHER PUBLICATIONS

Photograph of a tailgate mounting bracket that was on sale prior to Mar. 14, 1995.

*Primary Examiner*—Joseph D. Pape
*Attorney, Agent, or Firm*—Wells, St. John, Roberts, Gregory & Matkin P.S.

[57] ABSTRACT

A pair of mounting brackets are described for removable vehicle tailgates that have a prescribed height and thickness dimension. Each bracket includes an elongated rigid base member with a side surface extending between top and bottom ends. An adapter on each base member is used for attaching the base member to a vehicle. A pair of bottom flanges are provided at the bottom end of each base member, projecting from the side surface thereof and spaced apart to releasably receive the thickness dimension of the tailgate. A top flange is located adjacent the top end of each base member projecting from the side surface thereof. The top flange of each base member includes a bottom edge surface, and the bottom flanges of each base member include top edge surfaces spaced along the associated base member by a distance less than the prescribed height dimension of the tailgate and greater than the thickness dimension of the tailgate.

19 Claims, 6 Drawing Sheets

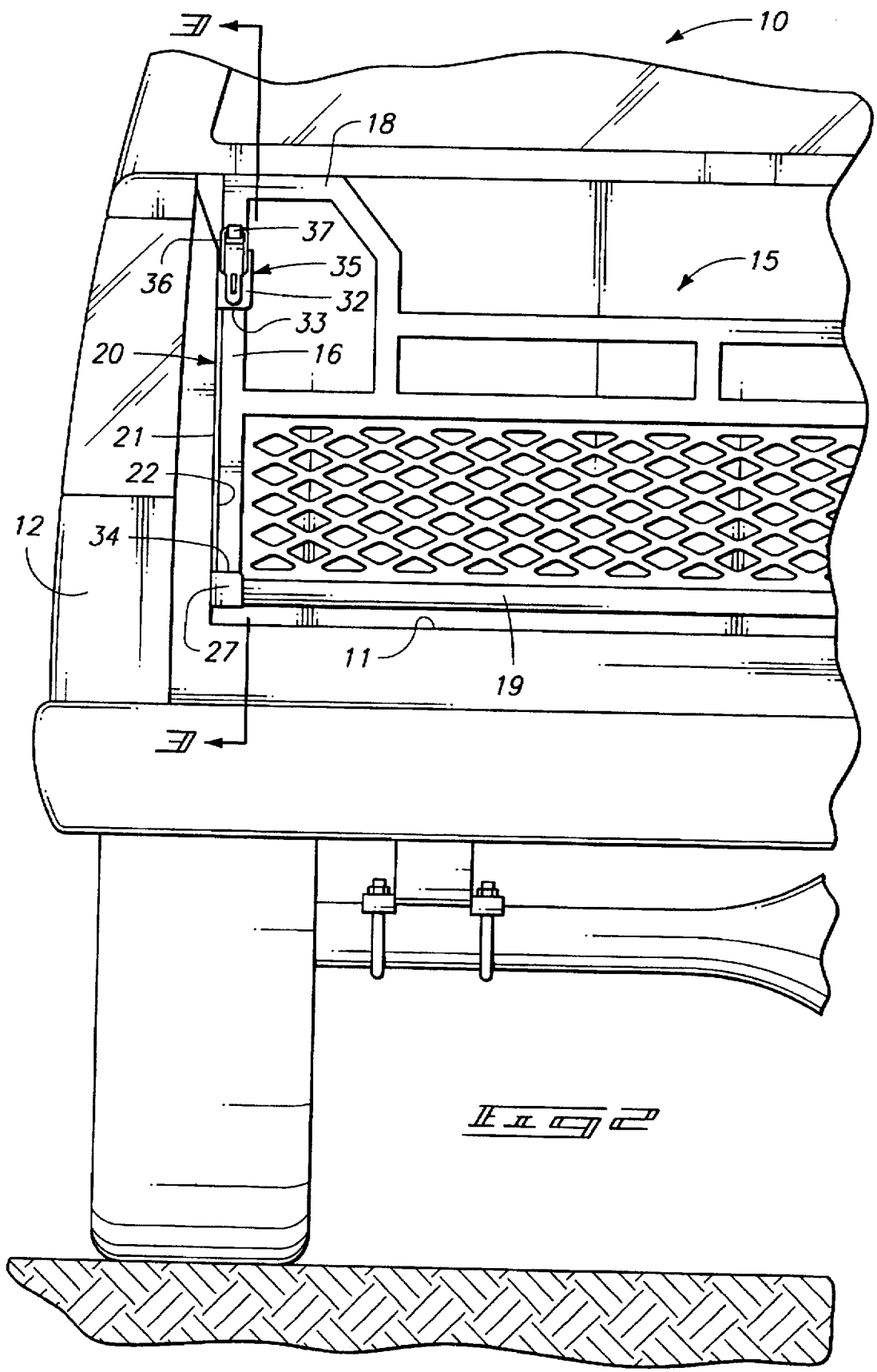

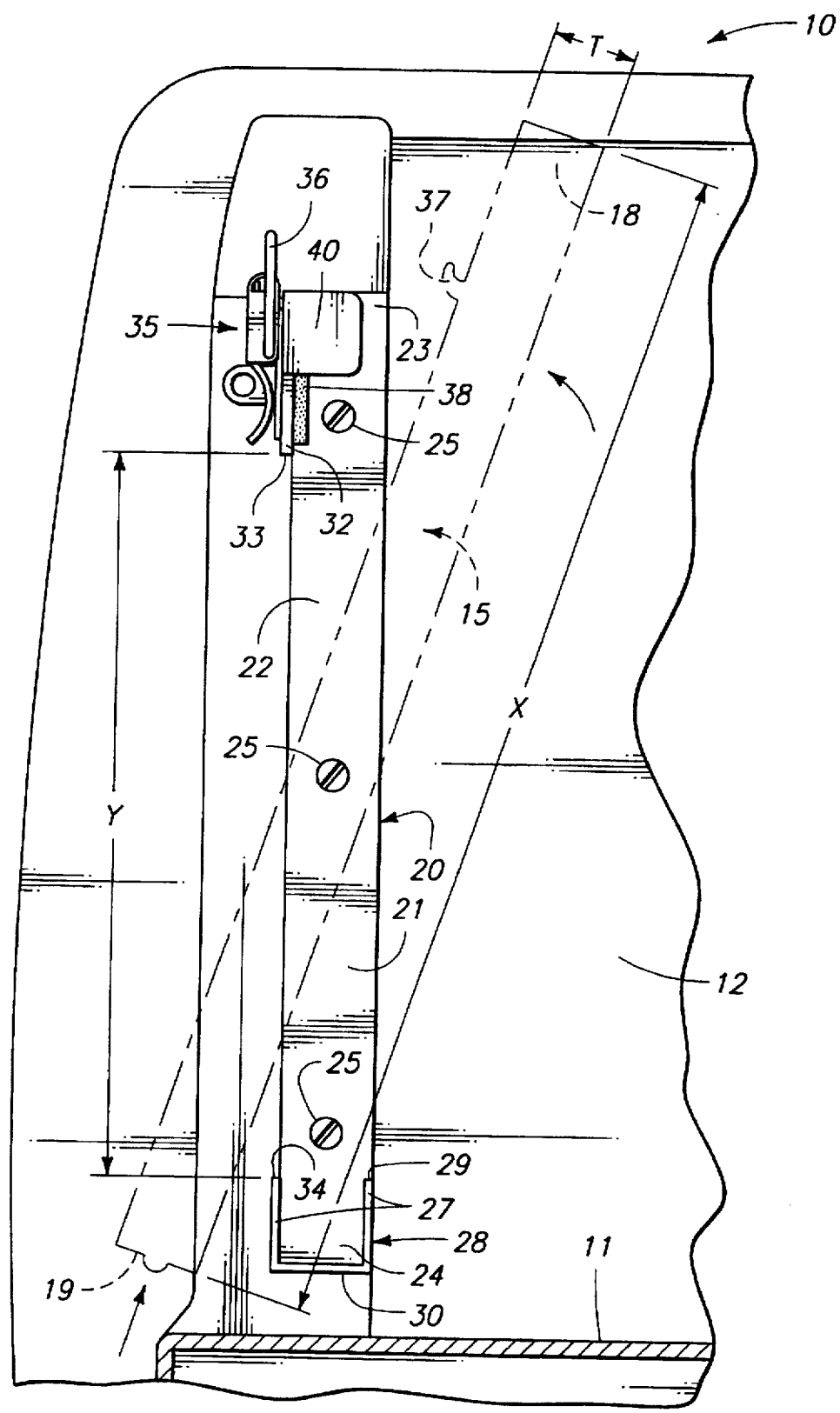

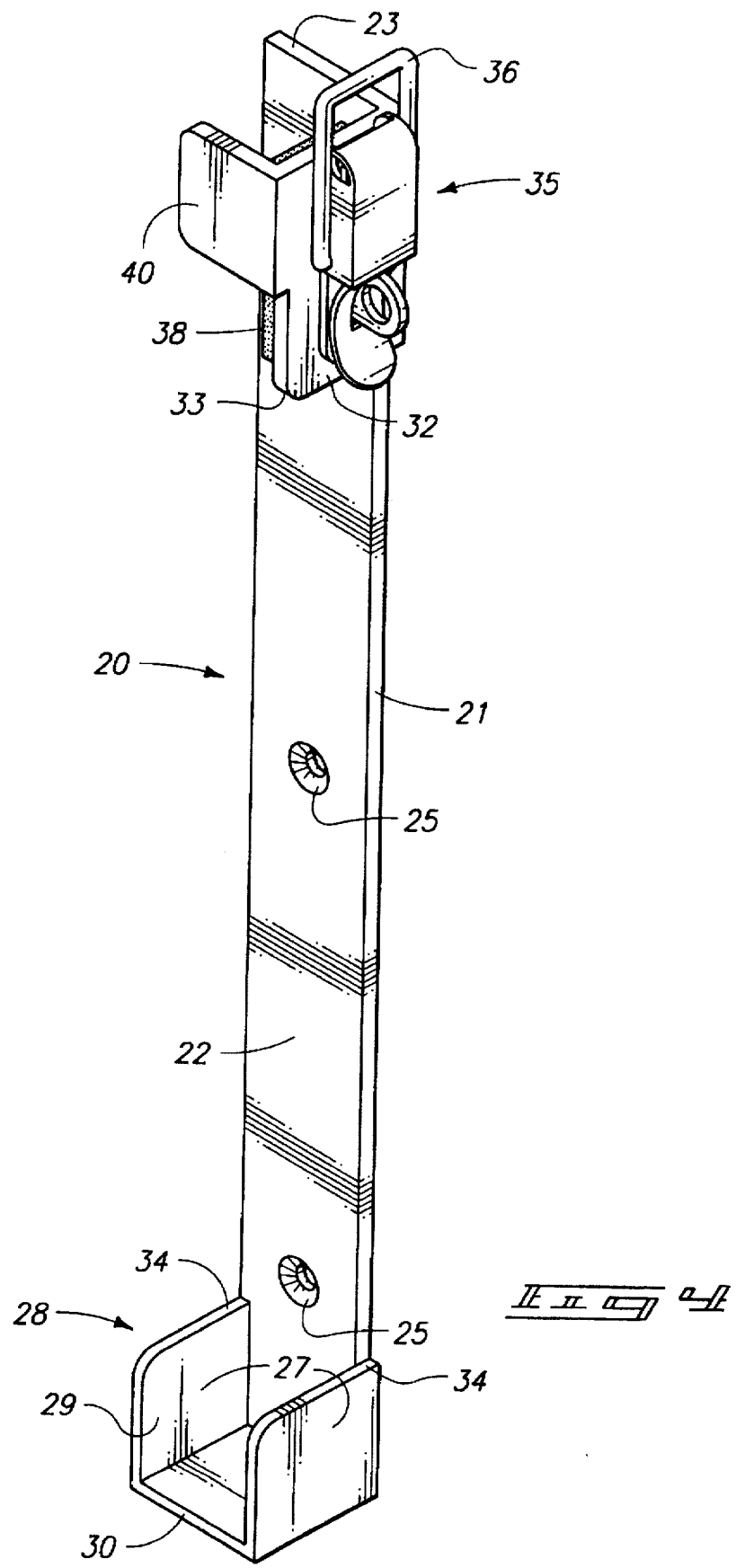

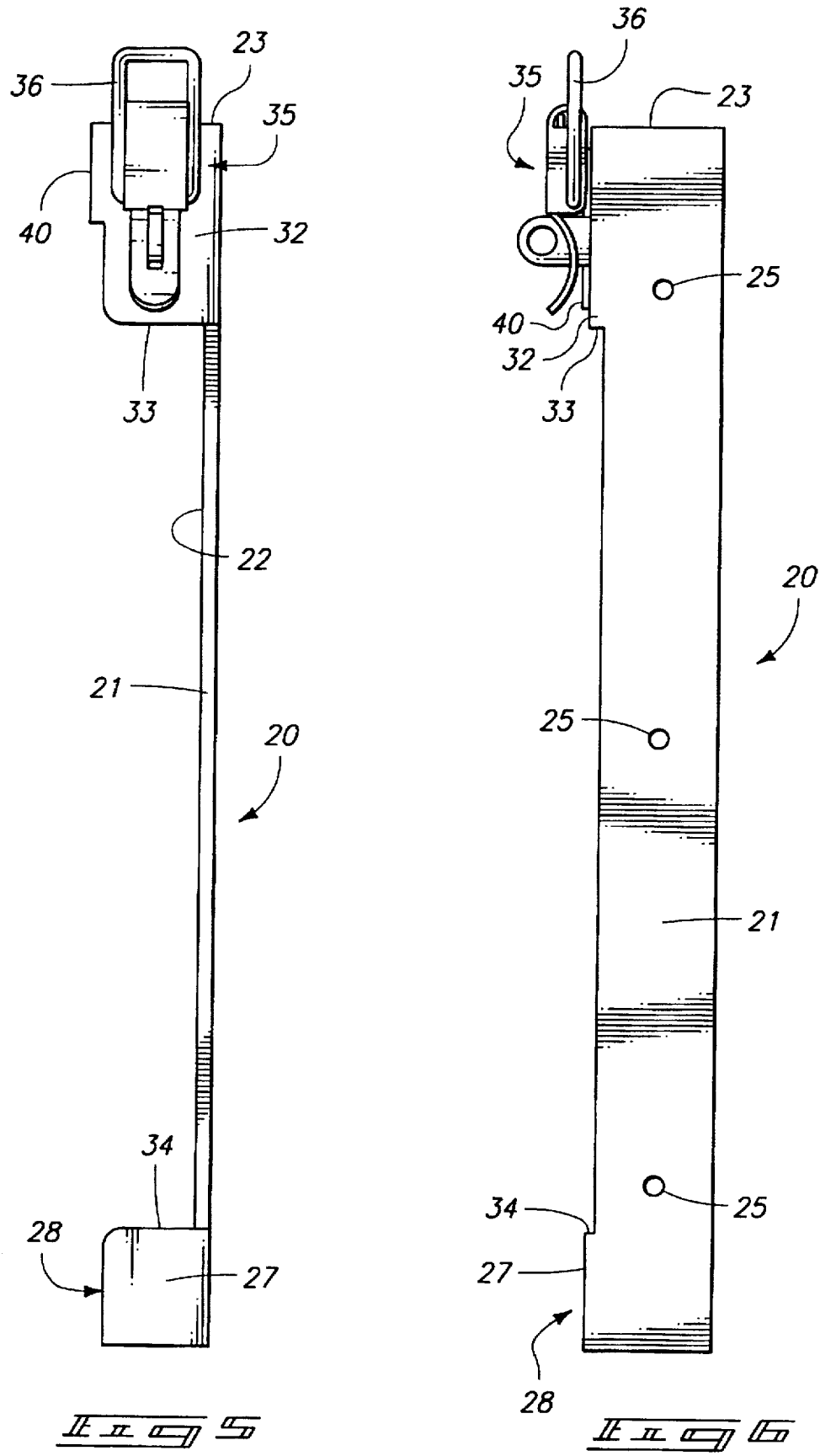

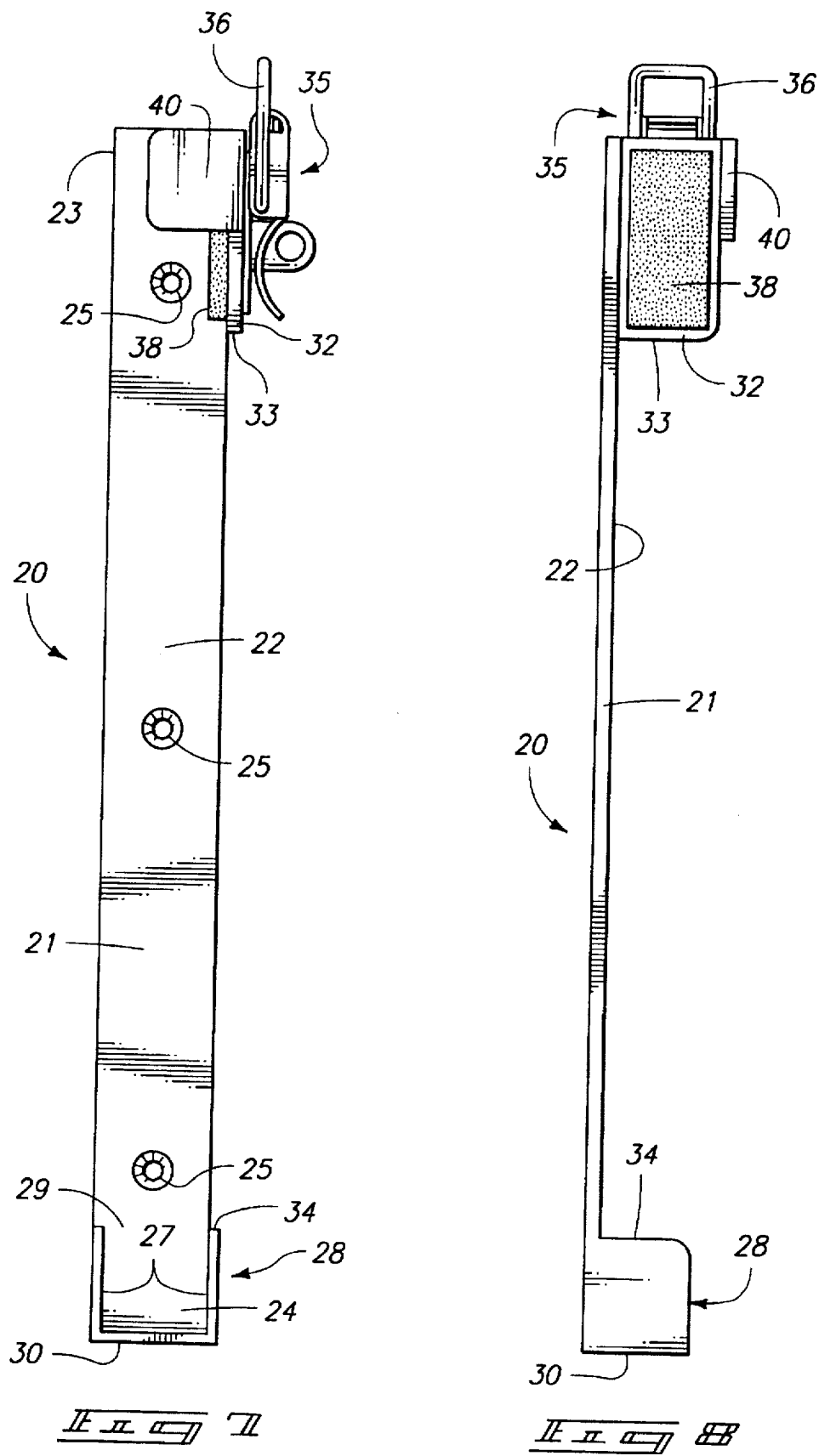

MOUNTING BRACKETS FOR REMOVABLE VEHICLE TAILGATE

TECHNICAL FIELD

The present invention relates to brackets for securing tailgates to vehicles.

BACKGROUND OF THE INVENTION

For various reasons many truck and recreation vehicle owners choose to replace existing vehicle tailgates with removable ventilated or other special use tailgates. Since the conventional tailgates are typically hinged on the vehicle, special mounting arrangements are often required for releasably securing the alternate tailgates. The mounting arrangements typically include forms of channel brackets that allow the tailgates to be slidably mounted from above. The tailgates must therefor be lifted into and out of engagement with the mounting brackets. This can be problematic, especially with heavy tailgates. Cargo can also interfere with the mounting or removal.

A need has therefor been realized for a bracket arrangement that will facilitate ease in mounting and dismounting removable tailgates.

The present tailgate mounting brackets solve the above need by providing positive, secure mounting, while facilitating mounting and dismounting with minimal lifting and requiring minimal vertical clearance above the tailgates.

BRIEF DESCRIPTION OF THE DRAWINGS

Preferred embodiments of the invention are described below with reference to the following accompanying drawings, in which:

FIG. 2 is an enlarged fragmentary view showing one bracket of the pair shown in FIG. 1;

FIG. 3 is an enlarged fragmentary view showing a portion of the vehicle, one of the preferred brackets, and showing a tailgate in phantom lines;

FIG. 4 is a perspective view of one preferred bracket;

FIG. 5 is a rear side elevation view of the preferred bracket;

FIG. 6 is a side view as seen from the right in FIG. 5;

FIG. 7 is a side view as seen from the left in FIG. 5; and

FIG. 8 is a side view as seen from the left in FIG. 7.

DETAILED DESCRIPTION OF THE PREFERRED EMBODIMENTS

Figure 1:
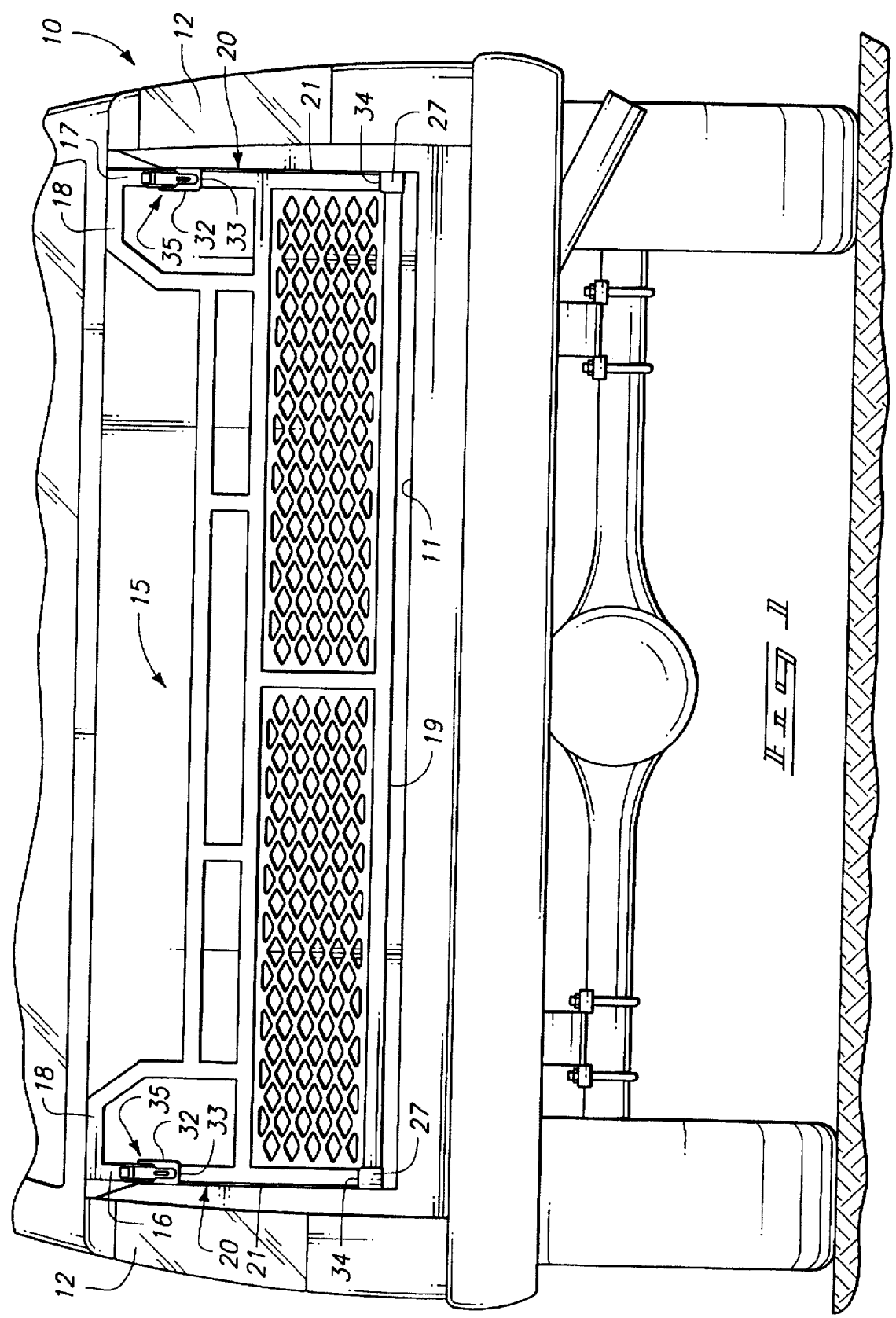
FIG. 1 is a rear view of a vehicle with a preferred form of the present mounting bracket pair shown mounting a tailgate.

This disclosure of the invention is submitted in furtherance of the constitutional purposes of the U.S. Patent Laws "to promote the progress of science and useful arts" (Article 1, Section 8).

Before giving a detailed description of the presently preferred form of our mounting brackets, a brief description of a vehicle and tailgate is appropriate for better understanding.

A vehicle such as a pickup truck 10 is partially shown in FIGS. 1 and 2 of the drawings. The vehicle 10 will include a bed 11 and opposed upright side walls 12. The size and shape of the vehicle, bed, and side walls may vary with different manufactures, makes and models, but the bed and side walls will typically be of the general nature shown.

In the illustrated example the conventional tailgate (not shown) has been removed, for replacement by a special use tailgate as exemplified at 15. The tailgate 15 is shown in side view by phantom lines in FIG. 3, which also includes dimensions "T" and "X" identifying the respective thickness ("T") and height ("X") of the tailgate structure. These dimensions are prescribed for various forms of tailgates 15, and the present mounting brackets may be produced for any such prescribed dimensions.

For further purposes of description, the exemplified tailgate includes opposed ends 16, 17 that are spaced apart according to the spacing between the vehicle side walls. The tailgate also includes opposed top and bottom edges 18, 19 respectively.

Typically the spacing between tailgate ends 16, 17 is slightly less than the distance between the vehicle side walls 12 to accommodate mounting brackets of conventional form (not shown) and which may be replaced by the present brackets shown generally at 20. In a preferred alternative, the present brackets 20 are to be produced and distributed along with particular tailgate structures.

The present brackets 20 are provided for mounting to a vehicle to releasably secure the tailgate 10 by releasably receiving the opposed tailgate ends 16, 17.

It is pointed out at this time that the individual brackets in each pair are preferably identical but matched opposites. But for exceptions noted below, description of one bracket will suffice for description of the other in a pair.

Each bracket of the pair includes an elongated rigid base member 21. In a preferred form, the base members 21 are formed of flat bars of rigid metal such as galvanized steel. Each base member includes a side surface 22 extending between respective top and bottom ends 23, 24.

An adapter generally identified at 25 is provided on each base member 21 for attaching the base member 21 to a vehicle, particularly a vehicle side wall 12. In the illustrated embodiment, the adapter is simply counter-sunk holes for use with sheet metal screws (not shown) to secure the brackets to the vehicle side walls 12 in opposition across the vehicle bed.

Other forms of adapter including mounting clamps, flanges, studs, and the like may be used as well. Alternatively the base members themselves may be provided as the adapters, as for example where the base members themselves are welded to the vehicle side walls. Still further it is conceivable that the base members could be integrated with the side walls of the vehicle, in which case the vehicle side walls themselves become the base members and the adapters become whatever securement is provided for attaching the side walls to the vehicle.

In a preferred form, a pair of bottom flanges 27 are provided at the bottom end 24 of each base member 21. The bottom flanges 27 project from the associated side surface 22 and are spaced apart to releasably receive the thickness dimension "T" of the tailgate 15. The flanges 27 assist to secure the tailgate against longitudinal movement with respect to the length of the vehicle bed 11.

In a more specific form, the flanges 27 are leg segments of a "U" shaped pocket 28 at the bottom end of each base member 21. The pockets 28 project from the side surface 22 (toward one another when installed) to releasably receive the thickness dimension of the tailgate 15. Each pocket includes an open end 29 oriented toward the top end 23 of the associated base member and a closed end 30 oriented toward the bottom end 24.

In the embodiment shown, the closed ends 30 of the pockets are positioned to receive and support the bottom end 19 of a tailgate so the top end 18 is situated at a known elevation for securing purposes.

The bottom flanges 27 and closed end 30 may be integral with, welded to, or otherwise secured to the base members 21. Preferred flanges 27 are substantially parallel and the closed ends 30 span at least part of the distance between adjacent flanges. It is also preferred that the flanges 27 and end 30 be relatively perpendicular to the associated side surfaces 22.

A top flange 32, in a preferred form, is situated adjacent the top end 23 of each base member 21. The top flanges 32 project (toward one another when installed) from associated side surfaces 22.

The top flanges 32 may be welded to or integral with the base members 21, in alignment with a rearward one of the bottom flanges 27 on each bracket. This alignment is best seen in FIG. 7 where the top flange and one of the bottom flange are aligned with a vertical edge of the associated base member 21. It is preferred that the co-planar surfaces of the aligned top and bottom flanges be arranged so they face forwardly, into the vehicle bed, when the brackets are installed on a vehicle as shown in FIG. 3. With this arrangement, the installed tailgate is prevented from tipping rearwardly and dropping from the vehicle.

The top flanges 32 terminate at bottom edges 33 that are each spaced by a prescribed distance from top edges 34 of the associated bottom flanges 27 or "U" shaped pocket 28 on the same base member. This distance is labeled "Y" in FIG. 3, and is less than the height dimension "X" of the tailgate 15 to be received. Distance "Y" is also greater than the thickness dimension "T" of the tailgate 15.

Separation of the top and bottom flanges 32, 27 allows space for insertion and removal of the tailgate 15 requiring only that the bottom edge 19 of the tailgate be lifted slightly higher than the bottom flanges 27. This is in contrast to prior brackets which required that the tailgate be lifted higher than the top of the brackets to be installed or removed.

With the present brackets installed on a vehicle, the tailgate can be easily mounted by inserting it angularly, somewhat in the manner shown by phantom lines in FIG. 3, between the top and bottom flanges. The gate can then be tilted back to the vertical and lifted into the pockets 28, between the bottom flanges 27. The flanges 27 will then loosely hold the gate in proximity to the top flanges 32 where a fastener 35 (described below) can be utilized to secure the gate in position.

The fastener 35 is operably connected to at least one of the base members 21 to releasably secure the tailgate to the base member. In a preferred form, the fastener is mounted to at least one of the top flanges 32.

While other forms of fasteners may be alternatively used, in a preferred form the fastener 35 is comprised of an over-center draw clasp having a catch portion 36 mounted to one (preferably both) of the base members 21, and a strike plate 37 mountable to the tailgate in position thereon for engagement by the catch portion 36.

Proper mounting positions on the tailgate for the strike plates 37 can be accurately determined by provision of the closed bottom ends 30 of the "U" shaped pockets 28. The closed bottom ends 30 will reliably hold the gate at a uniform height in relation to the top flanges where the catch portions 36 are mounted.

The preferred over-center draw clasp is shown securing the tailgate 15 in FIGS. 1 and 2, and the strike plate 37 is shown released from the catch portion 36 by phantom lines in FIG. 3. When latched, the over-center draw clasp will function to secure the tailgate firmly in position, pulled tightly against the top flange 32.

To avoid undue wear and possible rattling, a resilient pad 38 is advantageously provided on each of the top flanges 32. The pads 38 may be formed of appropriate resilient material such as natural or synthetic rubber, and are secured appropriately as by a conventional adhesive to the top flanges 32. The fasteners 35 will pull the gate up snugly against the pads, compressing them against the top flanges.

The various arrangements of components described above function well to releasably secure a tailgate to a vehicle, and to facilitate mounting and dismounting of the tailgate as described. Additional strength may be gained, however, by provision of secondary flanges 40 on one or both of the brackets.

The secondary flanges 40 are preferably secured by welding or are integral with the top flanges 32. They extend substantially parallel to the surfaces 22 on the base members 21, and are spaced from the surfaces to receive the tailgate ends 16, 17. The secondary flanges 40 are used to prevent unwanted movement of the gate, and to hold the gate as a more integral part of the vehicle side walls 12.

The present brackets 20 are installed simply by securing the base members 21 to the side walls 12 of the desired vehicle 10. This is done in the example illustrated, by positioning the brackets against the side walls, drilling holes using the adapter holes as guides, and securing the brackets with appropriate sheet metal screws, bolts or other appropriate fasteners. Welding may alternatively be used to secure the brackets to the vehicle, or, as suggested above, the brackets may be provided as integral parts of the vehicle side walls 12.

With the brackets in place, the tailgate 15 can be easily mounted. This is done by simply moving the gate angularly through the space "Y" as shown in FIG. 3. The bottom edge 19 of the gate is then lifted over the bottom flanges 27, and subsequently lowered, to slide between the bottom flanges. In the preferred brackets, the bottom gate edge 19 will come to rest against the closed ends 30 of the "U" shaped pockets.

If the tailgate is not previously supplied with strike plates 37, installation of such plates is easily accomplished at this time, using the catch portions 36 of the fasteners 35 as installation guides. The strikes may be installed using conventional hardware, or may be otherwise fastened in place as by welding.

The bottom flanges 27 will hold the gate roughly in a vertical position, with the strike plates 37 in position to be engaged by the catch portions 36 of the fasteners 35. The gate is thus easily secured simply by operating the fasteners 35, capturing the strike plates 37 by the catch portions 36 and using the over-center mechanisms to pull the gate tight against the resilient pads 38. The gate is now secure on the vehicle.

To dismount the gate, the fasteners are released and the gate is lifted slightly to elevate the bottom gate edge 19 above the bottom flanges 27. The gate may now be tipped forwardly and withdrawn rearwardly through the spaces "Y" between the top and bottom flanges 32, 27.

It should be noted from the above, that the tailgate need never be lifted above the brackets 20, during installation or removal. Consequently the brackets do not require significant vertical clearance to facilitate such steps. Yet when mounted, the gate is held secure and nearly becomes integral with the side walls 12 of the vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pair of mounting brackets for removable vehicle tailgates having a prescribed height and thickness dimension, comprising:

a pair of elongated rigid base members, each base member including a side surface extending between top and bottom ends;

an adapter on each base member for attaching the base member to a vehicle;

a pair of bottom flanges at the bottom end of each base member projecting from the side surface and spaced apart to releasably receive the thickness dimension of the tailgate;

a top flange adjacent the top end of each base member projecting from the side surface thereof; and wherein the top flange of each base member includes a bottom edge surface, and the bottom flanges of each base member include top edge surfaces spaced along the associated base member by a distance less than the prescribed height dimension of the tailgate and greater than the thickness dimension of the tailgate.

2. A pair of mounting brackets as defined by claim 1 further comprising a fastener operably connected to at least one of the base members, adapted to releasably secure a tailgate to the base.

3. A pair of mounting brackets as defined by claim 1 wherein the pair of bottom flanges on each base member are included as upright legs of a "U" shaped pocket, with an open end of the "U" shaped pocket oriented toward the top end of the base member and a closed end of the "U" shaped pocket oriented toward the bottom end of the base member.

4. A pair of mounting brackets as defined by claim 1 wherein the base member is a flat bar of rigid metal.

5. A pair of mounting brackets as defined by claim 1 wherein the top flange on each base member further includes a secondary top flange thereon that is substantially parallel to and spaced from the side surface of the base member.

6. A pair of mounting brackets as defined by claim 1 further comprising:

a fastener operably connected to at least one of the base members, adapted to releasably secure the tailgate to the base; and wherein the fastener is mounted to the top flange on said one base member.

7. A pair of mounting brackets as defined by claim 1 wherein the bottom flanges on each base member are substantially parallel and are spanned by a base wall forming a pocket adapted to receive the thickness dimension of a tailgate.

8. A pair of mounting brackets as defined by claim 1, further comprising a resilient pad on each of the top flanges.

9. A pair of mounting brackets as defined by claim 1 further comprising a clasp mounted to at least one of the top flanges, with a strike member adapted for mounting to the tailgate.

10. A pair of mounting brackets as defined by claim 1 further comprising a fastener including an over-center draw clasp with a catch mounted to one of the base members, and strike plate mountable to the tailgate in position thereon for engagement by the catch.

11. A pair of mounting brackets for removable vehicle tailgates having a prescribed height and thickness dimension, comprising:

a pair of elongated rigid base members, each base member including a side surface extending between top and bottom ends;

an adapter on each base member for attaching the base member to a vehicle;

a "U" shaped pocket at the bottom end of each base member projecting from the side surface to releasably receive the thickness dimension of the tailgate, with an open end of the "U" shaped pocket oriented toward the top end of the base member and a closed end of the "U" shaped pocket oriented toward the bottom end of the base member;

a top flange adjacent the top end of each base member projecting from the side surface thereof and spaced by a distance from the "U" shaped pocket that is less than the height dimension of the tailgate; and a fastener operably connected to at least one of the base members to releasably secure the tailgate to the base member.

12. A pair of mounting brackets as defined by claim 11 wherein the top flange on each base member further includes a secondary top flange thereon that is substantially parallel to and spaced from the side surface of the base member.

13. A pair of mounting brackets as defined by claim 11, further comprising a resilient pad on each of the top flanges.

14. A pair of mounting brackets as defined by claim 11, wherein the top flanges each include a forward surface and a rearward surface, and further comprising:

a resilient pad on the forward surface of each of the top flanges; and wherein the fastener is mounted to the rearward surface of said one flange.

15. A pair of mounting brackets as defined by claim 11, wherein the "U" shaped pockets are each formed by a pair of bottom flanges and wherein one of the bottom flanges of each pair is substantially aligned with the top flange on the associated base member.

16. A vehicle tailgate and mounting brackets for removably securing the tailgate to a vehicle, comprising:

a tailgate having a thickness dimension, and opposed end members having a prescribed height dimension;

a pair of elongated rigid base members, each base member including a side surface extending between top and bottom ends;

an adapter on each base member for attaching the base member to a vehicle;

pairs of bottom flanges adjacent the bottom ends of the base members and projecting toward one another from the side surfaces;

each pair of bottom flanges being spaced apart to releasably receive one of the end members of the tailgate;

top flanges adjacent the top ends of the base members projecting toward one another from the side surfaces of the base members;

each top flange releasably abutting one of the end members of the tailgate; and wherein the top flange of each base member includes a bottom edge surface, and the bottom flanges of each base member include top edge surfaces spaced along the associated base member by a distance less than the prescribed height dimension of the tailgate end members and greater than the thickness dimension of the tailgate.

17. A vehicle tailgate and mounting brackets as defined by claim 16 further comprising:

a fastener operably connected to at least one of the base members, to releasably secure the tailgate to the base; and wherein the fastener is mounted to the top flange on said one base member.

18. A vehicle tailgate and mounting brackets as defined by claim 16, further comprising a resilient pad on each of the top flanges releasably abutting one of the end members of the tailgate.

19. A vehicle tailgate and mounting brackets as defined by claim 16 wherein the pair of bottom flanges on each base member are included as upright legs of a "U" shaped pocket, with an open end of the "U" shaped pocket oriented toward the top end of the base member and a closed end of the "U" shaped pocket oriented toward the bottom end of the base member.

* * * * *